United States Patent
Jang et al.

(10) Patent No.: US 10,564,037 B2
(45) Date of Patent: Feb. 18, 2020

(54) METHOD AND APPARATUS FOR COMBINING COLORANTS USING CAMERA

(71) Applicant: ELECTRONICS AND TELECOMMUNICATIONS RESEARCH INSTITUTE, Daejeon (KR)

(72) Inventors: In Su Jang, Daejeon (KR); Soon Chul Jung, Daejeon (KR); Yoon Seok Choi, Daejeon (KR); Jin Seo Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 25 days.

(21) Appl. No.: 16/055,460

(22) Filed: Aug. 6, 2018

(65) Prior Publication Data
US 2019/0204154 A1    Jul. 4, 2019

(30) Foreign Application Priority Data
Dec. 29, 2017    (KR) .................. 10-2017-0184180

(51) Int. Cl.
*G01J 3/46*    (2006.01)
*G06T 7/90*    (2017.01)
(Continued)

(52) U.S. Cl.
CPC ............ *G01J 3/462* (2013.01); *G01J 3/0272* (2013.01); *G01J 3/457* (2013.01); *G01J 3/463* (2013.01);
(Continued)

(58) Field of Classification Search
CPC .......... G01J 3/462; G01J 3/0272; G01J 3/457; G01J 3/463; G01J 3/50; G06T 7/90; H04N 1/6008; H04N 1/6066
See application file for complete search history.

(56) References Cited

U.S. PATENT DOCUMENTS

| | | |
|---|---|---|
| 6,870,614 B2 | 3/2005 | Graf et al. |
| 2011/0246087 A1* | 10/2011 | Prakash .................. G01J 3/463 702/23 |

(Continued)

FOREIGN PATENT DOCUMENTS

| | | |
|---|---|---|
| KR | 10-2001-0097060 A | 11/2001 |
| KR | 10-2009-0042612 A | 4/2009 |
| KR | 10-2015-0098052 A | 8/2015 |

*Primary Examiner* — Jamil Ahmed
(74) *Attorney, Agent, or Firm* — LRK Patent Law Firm

(57) ABSTRACT

A method and apparatus for combining colorants using a camera. The method of combining colorants using a camera includes extracting color data from an image of an object captured using a camera, converting the color data into spectral reflection factor data of the object on the basis of a pre-constructed camera color model, acquiring spectral reflection factor data for an estimated colorant combination obtained by simulating a combination of colorant samples obtained from a colorant database, and selecting an optimal colorant combination by comparing errors between the spectral reflection factor data of the object and the spectral reflection factor data for the estimated colorant combination. Therefore, it is possible to use a highly accessible and inexpensive camera, such as a smartphone camera, and thus an ordinary user can easily find an optimal colorant combination.

20 Claims, 4 Drawing Sheets

(51) Int. Cl.
  *G01J 3/457*  (2006.01)
  *H04N 1/60*  (2006.01)
  *G01J 3/02*  (2006.01)
  *G01J 3/50*  (2006.01)

(52) U.S. Cl.
  CPC .............. *G01J 3/50* (2013.01); *G06T 7/90* (2017.01); *H04N 1/6008* (2013.01); *H04N 1/6066* (2013.01)

(56) References Cited

U.S. PATENT DOCUMENTS

| | | |
|---|---|---|
| 2012/0163717 A1 | 6/2012 | Cho et al. |
| 2014/0078293 A1 | 3/2014 | Beymore et al. |
| 2014/0177066 A1 | 6/2014 | Ikeda et al. |
| 2014/0240708 A1 | 8/2014 | Matsushita et al. |
| 2016/0080607 A1 | 3/2016 | Horita |

\* cited by examiner

METHOD AND APPARATUS FOR COMBINING COLORANTS USING CAMERA

CROSS REFERENCE TO RELATED APPLICATION

This application claims priority to Korean Patent Application No. 10-2017-0184180, filed Dec. 29, 2017 in the Korean Intellectual Property Office (KIPO), the entire content of which is hereby incorporated by reference.

BACKGROUND

1. Technical Field

Example embodiments of the present invention relate to a method and apparatus for combining colorants using a camera, and more specifically, to a method and apparatus for selecting an optimal colorant combination by acquiring color data from an image of an object captured using a camera, converting the acquired color data into spectral reflection factor data, and comparing the converted spectral reflection factor data with spectral reflection factor data of an estimated colorant combination.

2. Description of Related Art

It is difficult to obtain a desired color by using colorants such as paints, pigments, and dyes in the market because of the limit in available colorants that can be obtained. For this reason, it is common for a majority of users to combine or mix various colorants to reproduce a desired color. However, most users are experiencing a lot of trial and error since it is not easy to predict at what proportions colorants should be mixed to obtain a desired color. In particular, in a case of reproducing a color of an object or a picture, such challenges are more often encountered.

In order to solve such problems, an existing method of combining colorants measures a color of an object or picture to be reproduced using a colorimetric device and reproduces a desired color by mixing color reproduction materials on the basis of the measurement result.

However, the existing coloring method is costly and difficult to access by general users because an expensive device, such as a spectrophotometer, is required to measure the color of an object. Therefore, there is a need for a method of combining colorants which allows a general user to easily reproduce a desired color without requiring any cost.

SUMMARY

Accordingly, example embodiments of the present invention are provided to substantially obviate one or more problems due to limitations and disadvantages of the related art.

Example embodiments of the present invention provide a method of combining colorants using a camera.

Here, the method of combining colorants using a camera may include extracting color data from an image of an object captured using a camera; converting the color data into spectral reflection factor data of the object on the basis of a pre-constructed camera color model; acquiring spectral reflection factor data for an estimated colorant combination obtained by simulating a combination of colorant samples obtained from a colorant database; and selecting an optimal colorant combination by comparing errors between the spectral reflection factor data of the object and the spectral reflection factor data for the estimated colorant combination.

Here, the camera color model may be constructed by obtaining sample color data of a colored colorant sample captured using the camera and sample spectral reflection factor data of the colored colorant sample measured using a spectrocolorimeter and defining a relationship between the sample color data and the sample spectral reflection factor data.

Here, the converting of the color data into the spectral reflection factor data may be performed by taking into account information on lighting at the time of photographing the colorant sample.

Here, the color data may have a red-green-blue (RGB) data format.

Here, the estimated colorant combination may be formed of a combination of pieces of colorant data selected from pieces of colorant data obtained from the colorant database, by taking into consideration aging information of the object.

Here, the aging information may include at least one of pieces of information on a storage period of the object after coloring and a storage location environment.

Here, the colorant database may store at least one of pieces of information on a material of the object colored with the colorant sample, a type of the colorant sample, and a physical change amount of the colorant sample over time.

Here, the selecting of the optimal colorant combination may include comparing errors between the spectral reflection factor data of the object and each of the pieces of spectral reflection factor data for the estimated colorant combination and forming a colorant combination candidate group consisting of a plurality of estimated colorant combinations.

Here, the selecting of the optimal colorant combination further may include selecting an optimal colorant combination in which an error between spectral reflection factor data of the plurality of estimated colorant combinations and the spectral reflection factor data of the object is minimized.

Here, the selecting of the optimal colorant combination in which the error is minimized may include transforming the spectral reflection factor data of the plurality of estimated colorant combinations and the spectral reflection factor data of the object into a standard color space and selecting an estimated colorant combination in which a distance between the estimated colorant combination transformed into the standard color space and the object transformed into the standard color space is minimized as the optimal colorant combination.

Example embodiments of the present invention also provide an apparatus for combining colorants using a camera.

Here, the apparatus for combining colorants using a camera may include at least one processor; and a memory which stores instructions to instruct the at least one processor to perform at least one operation, wherein the at least one operation includes operations of extracting color data from an image of an object which is captured using a camera, converting the color data into spectral reflection factor data of the object on the basis of a pre-constructed camera color model, acquiring spectral reflection factor data for an estimated colorant combination obtained by simulating a combination of colorant samples obtained from a colorant database, and selecting an optimal colorant combination by comparing errors between the spectral reflection factor data of the object and the spectral reflection factor data for the estimated colorant combination.

Here, the camera color model may be constructed by obtaining sample color data of a colored colorant sample captured using the camera and sample spectral reflection factor data of the colored colorant sample measured using a spectrocolorimeter and defining a relationship between the sample color data and the sample spectral reflection factor data.

Here, the converting of the color data into the spectral reflection factor data may be performed by taking into account information on lighting at the time of photographing the colorant sample.

Here, the color data may have a red-green-blue (RGB) data format.

Here, the estimated colorant combination may be formed of a combination of pieces of colorant data selected from pieces of colorant data obtained from the colorant database, by taking into consideration aging information of the object.

Here, the aging information may include at least one of pieces of information on a storage period of the object after coloring and a storage location environment.

Here, the colorant database may store at least one of pieces of information on a material of the object colored with the colorant sample, a type of the colorant sample, and a physical change amount of the colorant sample over time.

Here, the selecting of the optimal colorant combination may include comparing errors between the spectral reflection factor data of the object and the spectral reflection factor data for the estimated colorant combination and forming a colorant combination candidate group consisting of a plurality of estimated colorant combinations.

Here, the selecting of the optimal colorant combination further may include selecting an optimal colorant combination in which an error between spectral reflection factor data of the plurality of estimated colorant combinations and the spectral reflection factor data of the object is minimized.

Here, the selecting of the optimal colorant combination in which the error is minimized may include transforming the spectral reflection factor data of the plurality of estimated colorant combinations and the spectral reflection factor data of the object into a standard color space and selecting an estimated colorant combination in which a distance between the estimated colorant combination transformed into the standard color space and the object transformed into the standard color space is minimized as the optimal colorant combination.

BRIEF DESCRIPTION OF DRAWINGS

Example embodiments of the present invention will become more apparent by describing example embodiments of the present invention in detail with reference to the accompanying drawings, in which.

DETAILED DESCRIPTION OF EXAMPLE EMBODIMENTS

Figure 1:
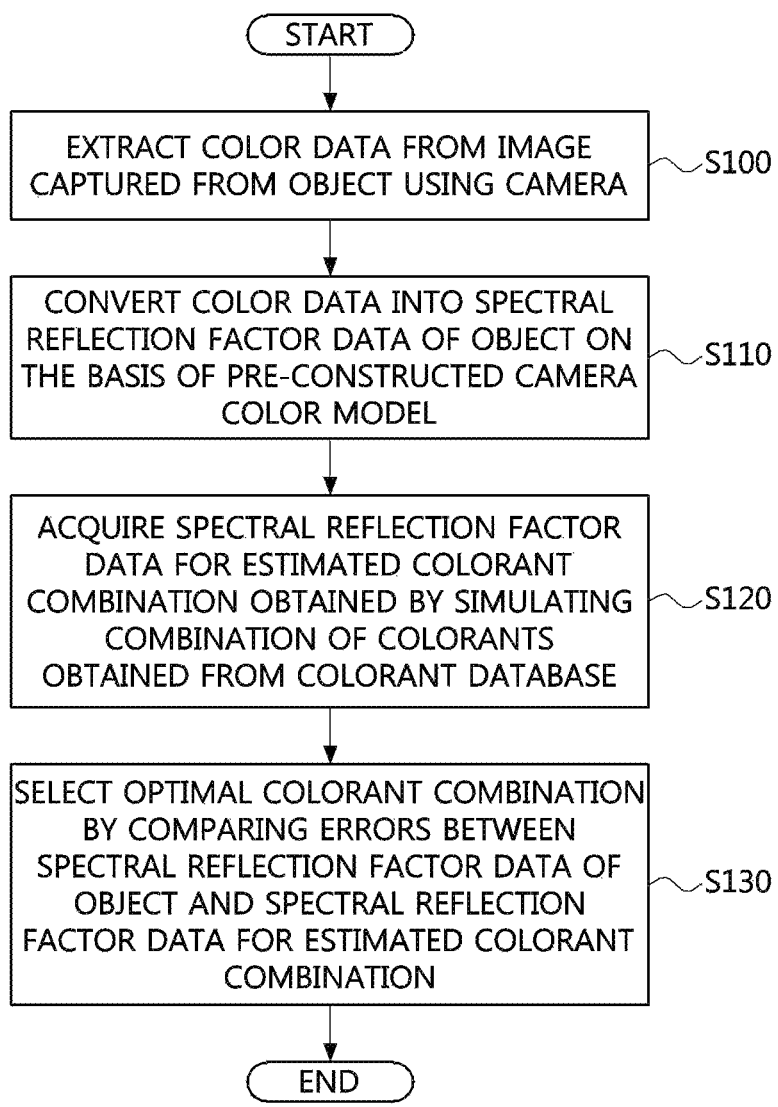
FIG. 1 is a flowchart illustrating a method of combining colorants using a camera according to one embodiment of the present invention.

Example embodiments of the present invention are disclosed herein. However, specific structural and functional details disclosed herein are merely representative for purposes of describing the example embodiments of the present invention, however, the example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to, limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements these elements should knot be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

In the present invention, colorants may be any substance including coloring and having a property of imparting color, may include both substances that have high opacity and are insoluble in water and substances that have high transparency and are soluble in water, and may be referred to as a pigment, a dye, or the like.

Hereinafter, exemplary embodiments of the present invention will be described in detail with reference to the accompanying drawings.

FIG. 1 is a flowchart illustrating a method of combining colorants using a camera according to one embodiment of the present invention.

Referring to FIG. 1, the method of combining colorants using a camera includes operations of extracting color data from an image of an object captured using a camera (S100), converting the color data into spectral reflection factor data of the object on the basis of a pre-constructed camera color model (S110), acquiring spectral reflection factor data for an estimated colorant combination obtained by simulating a combination of colorants obtained from a colorant database (S120), and selecting an optimal colorant combination by comparing errors between the spectral reflection factor data of the object and the spectral reflection factor data for the estimated colorant combination (S130).

More specifically, in the present invention, when a user uses a camera to capture an image of a target object having a color intended to be reproduced, color data is obtained from the captured image and then is converted into spectral reflection factor data. The converted spectral reflection factor data is compared with spectral reflection factor data for a colorant combination acquired from a pre-constructed colorant database and various combinations are repeatedly compared to select an optimal colorant combination.

In addition, the camera may include a camera embedded in a smartphone or a tablet, as well as a widely used digital camera such as a digital single lens reflex (DSLR) camera. Therefore, in the present invention, when an ordinary user captures an image of an object using a widely used general camera, it is possible to easily, automatically find an optimal colorant combination using a pre-constructed camera color model and a colorant database.

Here, the camera color model may define a relationship between color data of an image and a spectral reflection factor. Thus, the camera color model may be constructed in advance before the user captures an image of an object and then may be utilized.

Specifically, the camera color model may be constructed by obtaining sample color data of a colored colorant sample captured using the camera and sample spectral reflection factor data of the colored colorant sample measured using a spectrocolorimeter and defining a relationship between the sample color data and the sample spectral reflection factor data.

Here, in the operation S110 of converting the color data into the spectral reflection factor data of the object, the conversion may be performed by taking into account information on lighting at the time of photographing the colorant sample.

In this case, the color data may have a red-green-blue (RGB) data format.

In this case, the estimated colorant combination may be formed of a combination of pieces of colorant data selected from colorant data obtained from the colorant database, by taking into consideration aging information of the object.

In this case, the aging information may include at least one of pieces of information on a storage period of the object after coloring and a storage location environment.

In this case, the colorant database may store at least one of pieces of information on a material of the object colored with the colorant sample, a type of the colorant sample, and a physical change amount of the colorant sample over time.

The operation S130 of selecting the optimal colorant combination may include an operation of comparing errors between the spectral reflection factor data of the object and the spectral reflection factor data for the estimated colorant combination and forming a colorant combination candidate group consisting of a plurality of estimated colorant combinations.

The operation S130 of selecting the optimal colorant combination may further include an operation of selecting an optimal colorant combination in which the error between the spectral reflection factor data of the plurality of estimated colorant combinations and the spectral reflection factor data of the object is minimized.

Here, the operation of selecting the optimal colorant combination in which the error is minimized may include an operation of transforming the spectral reflection factor data of the plurality of estimated colorant combinations and the spectral reflection factor data of the object into a standard color space and an operation of selecting an estimated colorant combination in which a distance between the estimated colorant combination transformed into the standard color space and the object transformed into the standard color space is minimized as the optimal colorant combination.

Hereinafter, a process of performing each operation, the colorant database utilized in the process, and the camera color model will be described in more detail.

Figure 2:
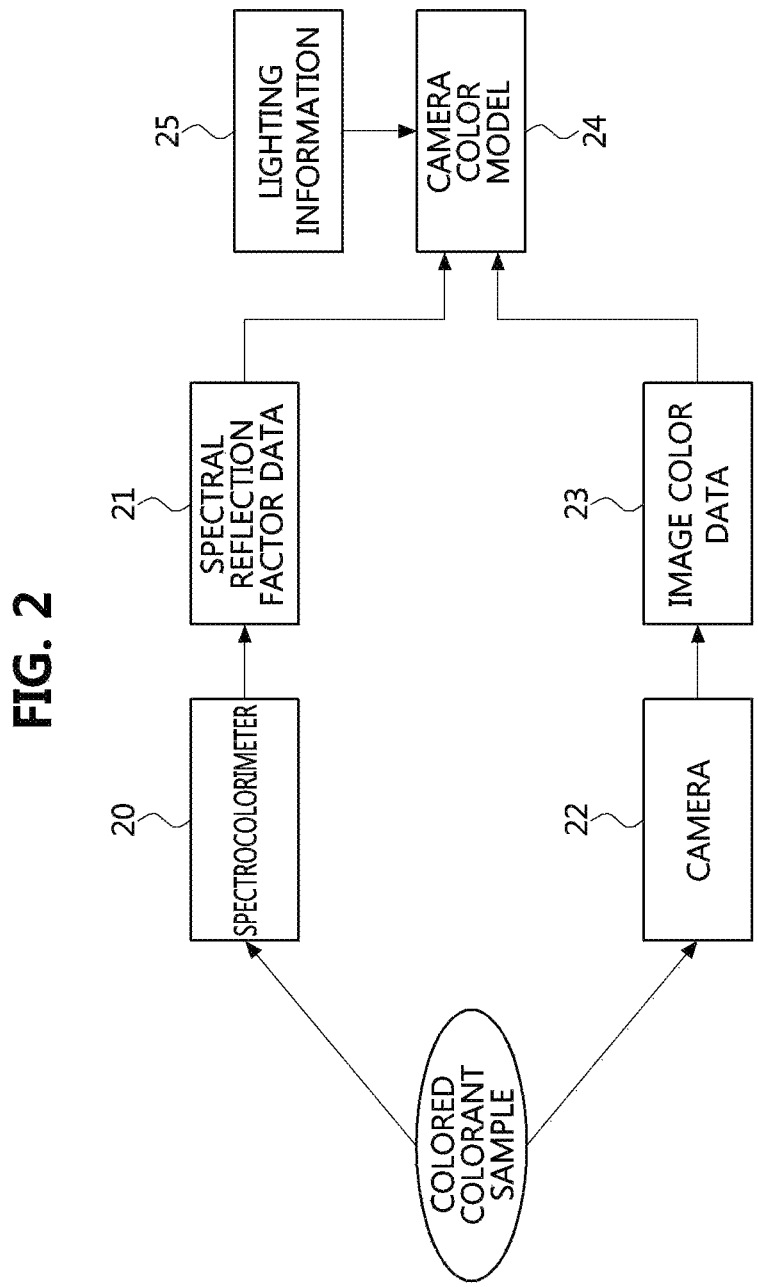
FIG. 2 is a conceptual diagram illustrating a process of constructing a camera color model according to one embodiment of the present invention.

FIG. 2 is a conceptual diagram illustrating a process of constructing a camera color model according to one embodiment of the present invention.

A method of constructing a camera color model for converting color data obtainable from an image captured by a camera into spectral reflection factor data is described with reference to FIG. 2.

First, a colored colorant sample is prepared. In this case, the colorant sample may be a sample painted on a canvas. However, in the present invention, the sample is not necessarily limited to a picture, and thus a sample painted on a stone, wood, plastic, paper, metal, or the like may be prepared. In addition, the colored colorant sample may be a colorant sample stored in a colorant database, which will be described below.

Then, a spectral reflection factor of the colored colorant sample may be measured using a spectrocolorimeter 20 to obtain spectral reflection factor data 21. In this case, the spectrocolorimeter 20 may be referred to as a spectrophotometer, which can measure a spectral reflection factor by measuring intensity of each wavelength included in reflected light of the object. In addition, as the spectral reflection factor data obtained using the spectrocolorimeter, spectral reflection factor data stored in advance in a colorant database, which will be described below, may be used.

In addition, captured image data may be obtained by capturing an image of the colored colorant sample using a camera 22. In this case, in more detail, color data 23 may be obtained from data of the captured image of the colorant sample, and the color data 23 may have a RGB data format.

Then, a mutual connection between the spectral reflection factor data 21 and the color data 23 is defined to obtain a camera color model 24. In this case, the camera color model 24 may be constructed by further reflecting information on lighting 25 (more specifically, spectral distribution of lighting) used in capturing the image using the camera so that an error occurring in conversion between the spectral reflection factor data 21 and the color data 23 can be minimized.

Figure 3:
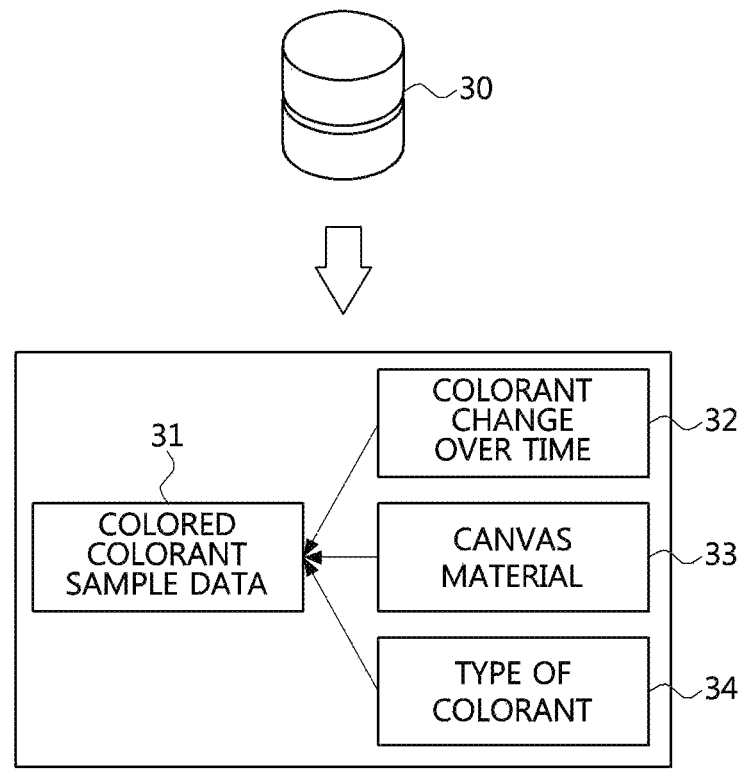
FIG. 3 is a diagram illustrating a configuration of a colorant database according to one embodiment of the present invention.

FIG. 3 is a diagram illustrating a configuration of a colorant database according to one embodiment of the present invention.

Referring to FIG. 3, a colorant database 30 is a database to be constructed in advance in order to select an optimal colorant combination and data for the colored colorant sample is stored therein. That is, colored colorant sample data 31 may include a physical measurement value, such as a spectral reflection factor of the colored colorant sample, and in this case, the physical measurement value may also include a colorant change amount 32 over time by reflecting a time, a location (temperature, humidity, and the like), and a change in colorant according to a dimming amount. In addition, the colored colorant sample data 31 may further include a measurement value obtained by changing a coloring material or a material 33 of a canvas, and may include a measurement value obtained by changing a type 34 of the colorant.

Therefore, the colorant database 30 may be constructed by including not only the colored colorant sample data 31 but also measurement data obtained by reflecting surrounding environmental factors (time, material, location, etc.) that affect the change in colorant.

Figure 4:
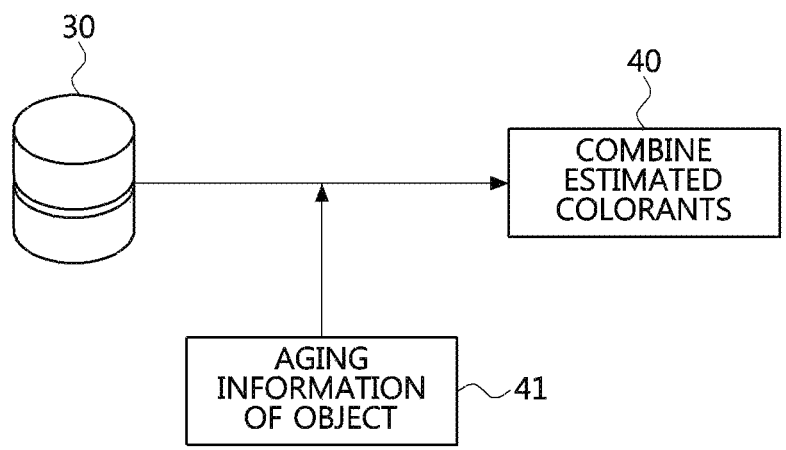
FIG. 4 is a conceptual diagram illustrating a method of obtaining an estimated colorant combination from a colorant database according to one embodiment of the present invention.

FIG. 4 is a conceptual diagram illustrating a method of obtaining an estimated colorant combination from a colorant database according to one embodiment of the present invention.

A method of selecting colorant sample data to be used for an estimated colorant combination by using the colorant database 30 of FIG. 3 may be described with reference to FIG. 4.

Specifically, since data of various colored colorant samples is stored in the colorant database 30, the colored colorant sample data may be extracted from the colorant database 30. In this case, in order to identify a color of a target object, it is necessary to take into account aging information 42 including a storage period of the object after coloring, a storage location environment (temperature, humidity, dimming amount, etc.). Thus, when the user inputs the aging information 41 of the object, changes in pieces of colorant sample data in the colorant database are simulated by taking into account the input aging information 41, so that colorant sample data to be ultimately used can be selected and a combination of pieces of selected colorant sample data may be used as an estimated colorant combination 40 to be compared with spectral reflection factor data of the object.

Further, when the user has information on a colorant used for the object or a canvas material, corresponding information may be input to extract more accurate colorant sample data from the colorant database and the extracted colorant sample data may be used in simulation.

Figure 5:
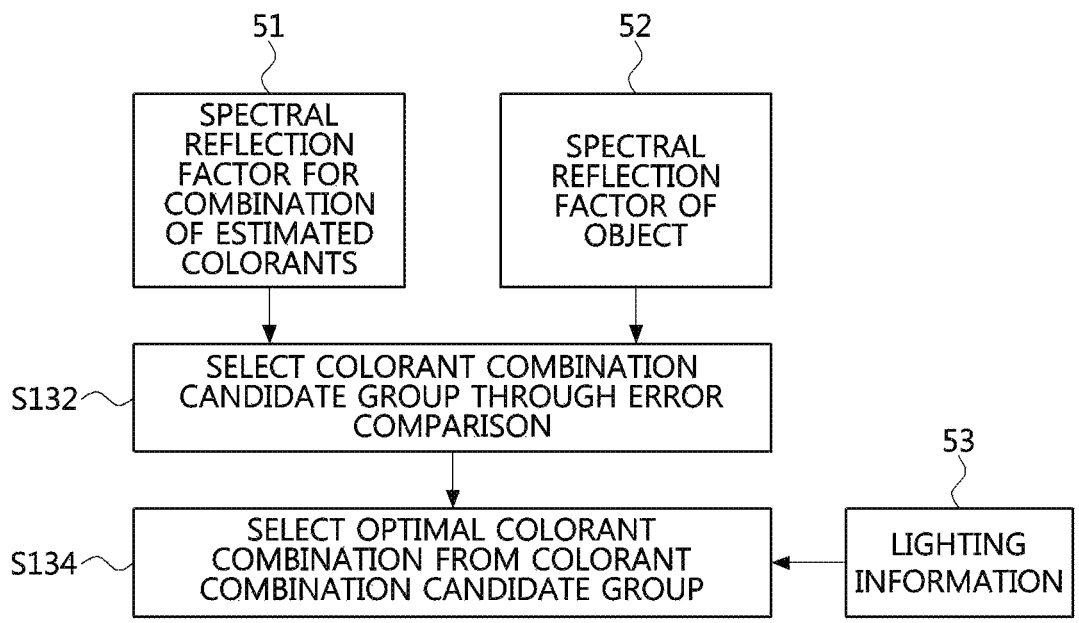
FIG. 5 is a conceptual diagram illustrating a method selecting an optimal colorant combination according to one embodiment of the present invention.

FIG. 5 is a conceptual diagram illustrating a method selecting an optimal colorant combination according to one embodiment of the present invention.

A process of comparing spectral reflection factors 51 for an estimated colorant combination and a spectral reflection factor 52 of an object and selecting an optimal colorant combination may be described with reference to FIG. 5. The spectral reflection factors 51 for the estimated colorant combination used herein may be obtained as physical measurement values obtainable from the estimated colorant combination 40 and the colorant database 30 shown in FIG. 4.

In addition, the spectral reflection factor 52 of the object may be derived by converting color data acquired from image data obtained by a user photographing the object into spectral reflection factor data on the basis of the camera color model 24 of FIG. 2.

First, through comparison of errors between the spectral reflection factor 52 of the object and each of the spectral reflection factors 51 for the estimated colorant combination, a colorant combination candidate group may be selected (S132). In this case, the estimated colorant combination shown in FIG. 4 may be newly selected and compared with the spectral reflection factor 52 of the object and estimated colorant combinations having an error that is lower than or equal to a predetermined threshold value are collected to form the colorant combination candidate group. In addition, a method of comparing errors may be performed by computing a root-mean square error between the spectral reflection factor 52 of the object and the spectral reflection factor 51 for the estimated colorant combination and comparing computed root-mean square errors.

In addition, an optimal colorant combination may be selected from the above-described colorant combination candidate group. In this case, in the operation S134 of selecting the optimal colorant combination, the spectral reflection factors for the colorant combination candidate group and the spectral reflection factor of the object may be transformed into a standard color space using light information 53 at the time of photographing the object and a colorant combination in which a distance difference in the standard color space is minimized may be selected from the colorant combination candidate group.

In this case, the standard color space may be, for example, CIERGB, CIEXYZ, or CIELAB. Here, since the standard color space is defined as a three-dimensional (3D) space and distance comparison is available in the 3D space, it is possible to compare distances of the colorant combination candidate group and the object.

Figure 6:
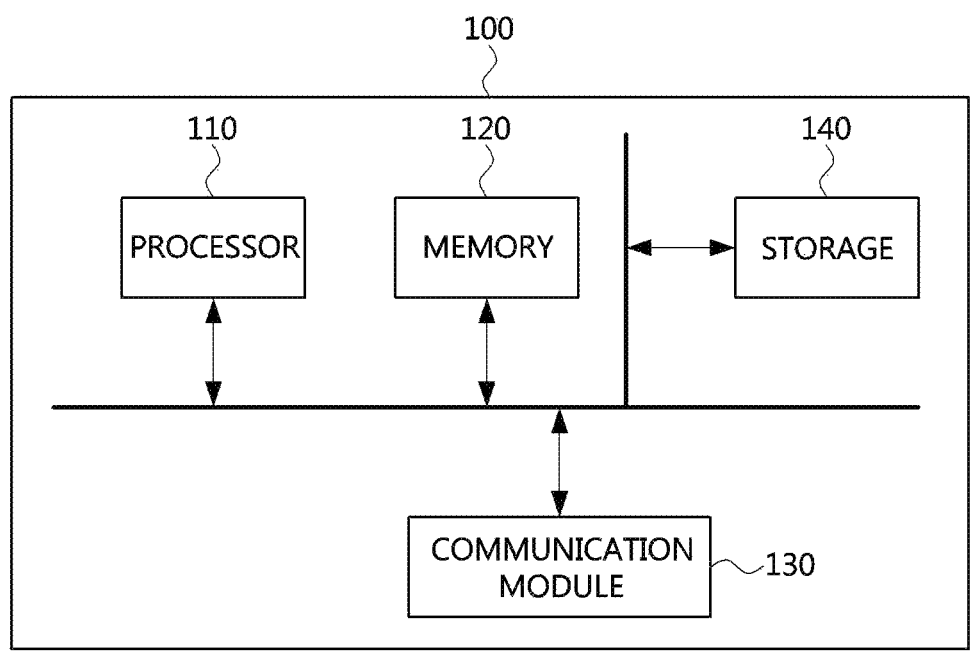
FIG. 6 is a configuration diagram illustrating an apparatus for combining colorants using a camera according to one embodiment of the present invention.

FIG. 6 is a configuration diagram illustrating an apparatus for combining colorants using a camera according to one embodiment of the present invention.

Referring to FIG. 6, the apparatus 100 for combining colorants using a camera includes at least one processor 110 and a memory which stores instructions to instruct the at least one processor 110 to perform at least one operation.

Here, the at least one operation may include operations of extracting color data from an image of an object which is captured using a camera, converting the color data into spectral reflection factor data of the object on the basis of a pre-constructed camera color model, acquiring pieces of spectral reflection factor data for an estimated colorant combination obtained by simulating a combination of colorant samples obtained from a colorant database, and selecting an optimal colorant combination by comparing errors between the spectral reflection factor data of the object and each of the pieces of spectral reflection factor data for the estimated colorant combination.

Here, the camera color model may be constructed by obtaining sample color data of a colored colorant sample captured using the camera and sample spectral reflection factor data of the colored colorant sample measured using a spectrocolorimeter and defining a relationship between the sample color data and the sample spectral reflection factor data.

Here, in the operation of converting the color data into the spectral reflection factor data of the object, the conversion may be performed by taking into account information on lighting at the time of photographing the colorant sample.

In this case, the color data may have a RGB data format.

In this case, the estimated colorant combination may be formed of a combination of pieces of colorant data selected from colorant data obtained from the colorant database, by taking into consideration aging information of the object.

In this case, the aging information may include at least one of pieces of information on a storage period of the object after coloring and a storage location environment.

In this case, the colorant database may store at least one of pieces of information on a material of the object colored with the colorant sample, a type of the colorant sample, and a physical change amount of the colorant sample over time.

The operation of selecting the optimal colorant combination may include an operation of comparing errors between the spectral reflection factor data of the object and each of the pieces of spectral reflection factor data for the estimated colorant combination and forming a colorant combination candidate group consisting of a plurality of estimated colorant combinations.

The operation of selecting the optimal colorant combination may further include an operation of selecting an optimal colorant combination in which the error between the spectral reflection factor data of the plurality of estimated colorant combinations and the spectral reflection factor data of the object is minimized.

In this case, the operation of selecting the optimal colorant combination in which the error is minimized may include an operation of transforming spectral reflection factor data of the plurality of estimated colorant combinations and the spectral reflection factor data of the object into a standard color space and an operation of selecting an estimated colorant combination in which a distance between the estimated colorant combination transformed into the standard color space and the object transformed into the standard color space is minimized as the optimal colorant combination.

The apparatus 100 for combining colorants using a camera may be, for example, a desktop computer capable of communication, a laptop computer, a notebook computer, a smartphone, a tablet personal computer (PC), a mobile phone, a smart watch, smart glasses, an e-book reader, a portable multimedia player (PMP), a portable game console, a navigation device, a digital camera, a digital multimedia broadcasting (DMB) player, a digital audio recorder, a digital audio player, a digital video recorder, a digital video player, a personal digital assistant (PDA), or the like.

When the above-described method and apparatus for combining colorants using a camera according to the present invention is used, it is possible to use an inexpensive and highly-accessible camera, such as a smartphone camera, and thus an ordinary user can easily find an optimal colorant combination.

In addition, since not only a lighting environment at the time of photographing with a camera but also time or a change in location environment can be reflected, so that it is possible to find a much more optimal colorant combination.

While the example embodiments of the present invention and their advantages have been described in detail, it should be understood that various changes, substitutions and alterations may be made herein without departing from the scope of the invention.

What is claimed is:

1. A method of combining colorants using a camera, comprising:
    extracting color data from an image of an object captured using a camera;
    converting the color data into spectral reflection factor data of the object on the basis of a pre-constructed camera color model;
    acquiring spectral reflection factor data for an estimated colorant combination obtained by simulating a combination of colorant samples obtained from a colorant database; and
    selecting an optimal colorant combination by comparing errors between the spectral reflection factor data of the object and the spectral reflection factor data for the estimated colorant combination.

2. The method of claim 1, wherein the camera color model is constructed by obtaining sample color data of a colored colorant sample captured using the camera and sample spectral reflection factor data of the colored colorant sample measured using a spectrocolorimeter and defining a relationship between the sample color data and the sample spectral reflection factor data.

3. The method of claim 1, wherein the converting of the color data into the spectral reflection factor data is performed by taking into account information on lighting at the time of photographing the colorant sample.

4. The method of claim 1, wherein the color data has a red-green-blue (RGB) data format.

5. The method of claim 1, wherein the estimated colorant combination is formed of a combination of pieces of colorant data selected from pieces of colorant data obtained from the colorant database, by taking into consideration aging information of the object.

6. The method of claim 5, wherein the aging information includes at least one of pieces of information on a storage period of the object after coloring and a storage location environment.

7. The method of claim 1, wherein the colorant database stores at least one of pieces of information on a material of the object colored with the colorant sample, a type of the colorant sample, and a physical change amount of the colorant sample over time.

8. The method of claim 1, wherein the selecting of the optimal colorant combination comprises comparing errors between the spectral reflection factor data of the object and each of the pieces of spectral reflection factor data for the estimated colorant combination and forming a colorant combination candidate group consisting of a plurality of estimated colorant combinations.

9. The method of claim 8, wherein the selecting of the optimal colorant combination further comprises selecting an optimal colorant combination in which an error between spectral reflection factor data of the plurality of estimated colorant combinations and the spectral reflection factor data of the object is minimized.

10. The method of claim 9, wherein the selecting of the optimal colorant combination in which the error is minimized comprises:
    transforming the spectral reflection factor data of the plurality of estimated colorant combinations and the spectral reflection factor data of the object into a standard color space; and selecting an estimated colorant combination in which a distance between the estimated colorant combination transformed into the standard color space and the object transformed into the standard color space is minimized as the optimal colorant combination.

11. An apparatus for combining colorants using a camera, comprising:
at least one processor; and
a memory which stores instructions to instruct the at least one processor to perform at least one operation,
wherein the at least one operation includes:
extracting color data from an image of an object which is captured using a camera;
converting the color data into spectral reflection factor data of the object on the basis of a pre-constructed camera color model;
acquiring spectral reflection factor data for an estimated colorant combination obtained by simulating a combination of colorant samples obtained from a colorant database; and
selecting an optimal colorant combination by comparing errors between the spectral reflection factor data of the object and the spectral reflection factor data for the estimated colorant combination.

12. The apparatus of claim 11, wherein the camera color model is constructed by obtaining sample color data of a colored colorant sample captured using the camera and sample spectral reflection factor data of the colored colorant sample measured using a spectrocolorimeter and defining a relationship between the sample color data and the sample spectral reflection factor data.

13. The apparatus of claim 11, wherein the converting of the color data into the spectral reflection factor data is performed by taking into account information on lighting at the time of photographing the colorant sample.

14. The apparatus of claim 11, wherein the color data has a red-green-blue (RGB) data format.

15. The apparatus of claim 11, wherein the estimated colorant combination is formed of a combination of pieces of colorant data selected from pieces of colorant data obtained from the colorant database, by taking into consideration aging information of the object.

16. The apparatus of claim 15, wherein the aging information includes at least one of pieces of information on a storage period of the object after coloring and a storage location environment.

17. The apparatus of claim 11, wherein the colorant database stores at least one of pieces of information on a material of the object colored with the colorant sample, a type of the colorant sample, and a physical change amount of the colorant sample over time.

18. The apparatus of claim 11, wherein the selecting of the optimal colorant combination comprises comparing errors between the spectral reflection factor data of the object and the spectral reflection factor data for the estimated colorant combination and forming a colorant combination candidate group consisting of a plurality of estimated colorant combinations.

19. The apparatus of claim 18, wherein the selecting of the optimal colorant combination further comprises selecting an optimal colorant combination in which an error between spectral reflection factor data of the plurality of estimated colorant combinations and the spectral reflection factor data of the object is minimized.

20. The apparatus of claim 19, wherein the selecting of the optimal colorant combination in which the error is minimized comprises:
transforming the spectral reflection factor data of the plurality of estimated colorant combinations and the spectral reflection factor data of the object into a standard color space; and
selecting an estimated colorant combination in which a distance between the estimated colorant combination transformed into the standard color space and the object transformed into the standard color space is minimized as the optimal colorant combination.

\* \* \* \* \*